United States Patent
Kribus et al.

(10) Patent No.: US 8,640,689 B1
(45) Date of Patent: Feb. 4, 2014

(54) DIRECT-ABSORPTION RECEIVER

(75) Inventors: Abraham Kribus, Tel Aviv (IL); Dan Reznik, New York, NY (US); William Gross, Pasadena, CA (US)

(73) Assignee: eSolar, Inc., Burbank, CA (US)

( * ) Notice: Subject to any disclaimer, the term of this patent is extended or adjusted under 35 U.S.C. 154(b) by 620 days.

(21) Appl. No.: 12/887,418

(22) Filed: Sep. 21, 2010

Related U.S. Application Data

(60) Provisional application No. 61/246,626, filed on Sep. 29, 2009.

(51) Int. Cl.
*F24J 2/46* (2006.01)

(52) U.S. Cl.
USPC ............ 126/623; 126/643; 126/663; 126/674

(58) Field of Classification Search
USPC .................... 126/663, 623, 643, 674
See application file for complete search history.

(56) References Cited

U.S. PATENT DOCUMENTS

| | | | | |
|---|---|---|---|---|
| 4,233,957 A * | 11/1980 | Kenny | ........................... | 126/652 |
| 4,643,168 A * | 2/1987 | Butler | ........................... | 126/650 |
| 5,421,322 A * | 6/1995 | Karni et al. | .................... | 126/680 |
| 7,011,086 B2 * | 3/2006 | Litwin | ........................... | 126/651 |
| 7,997,264 B2 * | 8/2011 | Sankrithi | ....................... | 126/697 |
| 2009/0277441 A1 * | 11/2009 | Jensen | ........................... | 126/643 |
| 2011/0283995 A1 * | 11/2011 | Kesseli et al. | .................. | 126/698 |
| 2012/0175082 A1 * | 7/2012 | Kmetovicz et al. | ....... | 165/104.21 |
| 2012/0274069 A1 * | 11/2012 | Venetos et al. | .................. | 290/52 |

FOREIGN PATENT DOCUMENTS

JP          57-037659          *  3/1982   ................. F24J 3/02

* cited by examiner

*Primary Examiner* — Kenneth Rinehart
*Assistant Examiner* — Gajanan Prabhu
(74) *Attorney, Agent, or Firm* — Brooks Acordia IP Law, P.C.; Pejman Yedidsion; Christopher Weiss

(57) ABSTRACT

Embodiments provide a solar thermal receiver comprising: (a) a first containing member transparent to sunlight; (b) a second containing member comprising an inner surface reflective of sunlight; (c) an inlet proximate to the first containing member that is configured to receive injected heat transfer fluid; and (d) an outlet distal from the first containing member, where the first containing member and the second containing member together form a vessel configured to conduct injected heat transfer fluid from the inlet to the outlet under hydrostatic pressure.

22 Claims, 5 Drawing Sheets

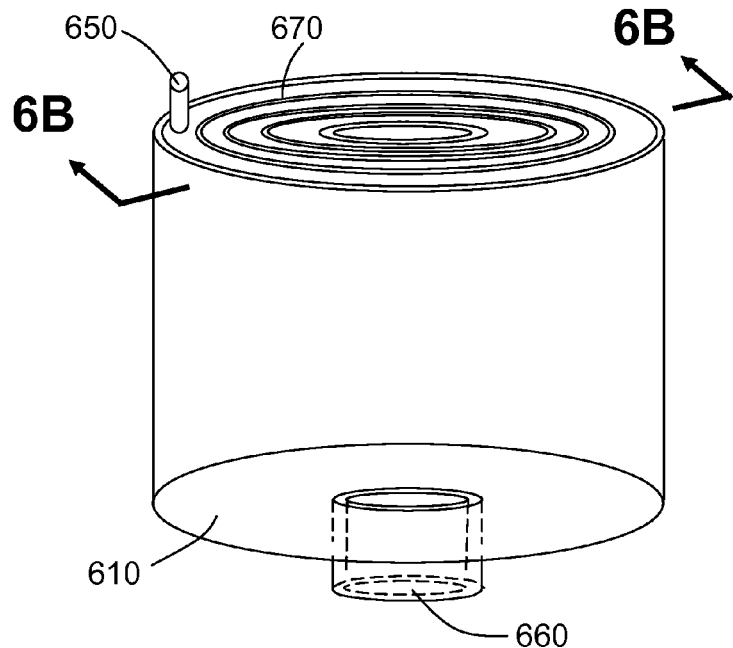
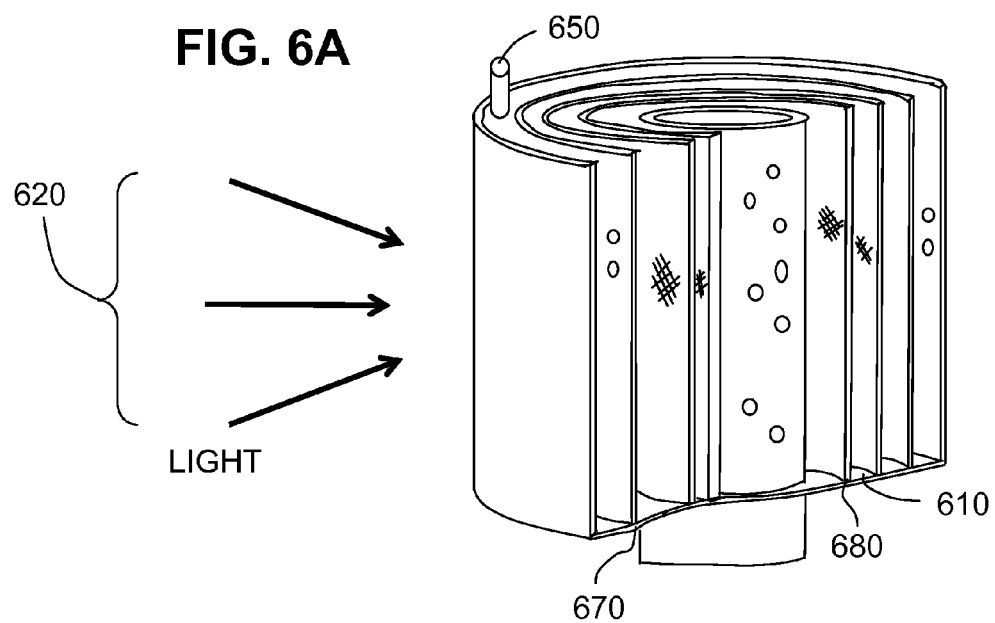
FIG. 6A
FIG. 6B

DIRECT-ABSORPTION RECEIVER

CROSS-REFERENCE TO RELATED APPLICATIONS

This application claims the benefit of U.S. Provisional Application No. 61/246,626, filed Sep. 29, 2009, the disclosure of which is incorporated by reference in its entirety herein for all purposes.

TECHNICAL FIELD

Embodiments pertain to direct-absorption receivers (DARs) for solar-thermal applications.

BACKGROUND

A solar receiver absorbs heat from concentrated sunlight striking one or more panels of opaque absorber tubes containing heat transfer fluid (HTF). Radiation to ambient may occur where the absorber surface temperatures exceed ambient temperature. Temperature gradients between the internal wall of an absorber and the moving HTF may lead to thermal stress, fluid degradation, and inefficient heat transfer.

SUMMARY

Embodiments provide a direct-absorption receiver comprising: (a) a first containing member transparent to sunlight; (b) a second containing member comprising an inner surface reflective of sunlight; (c) an inlet proximate to the first containing member that is configured to receive injected heat transfer fluid; and (d) an outlet distal from the first containing member, where the first containing member and the second containing member together form a vessel configured to conduct injected heat transfer fluid from the inlet to the outlet under hydrostatic pressure.

Another embodiment optionally comprises at least one flow spreader interposed in the vessel.

In another embodiment, the direct-absorption receiver may comprise at least one absorber member disposed in the vessel.

BRIEF DESCRIPTION OF THE DRAWINGS

Embodiments are illustrated by way of example and not limitation in the figures of the accompanying drawings, and in which:

FIG. 6A depicts an exemplary receiver; and

FIG. 6B depicts a cross-sectional view of FIG. 6A.

DETAILED DESCRIPTION

Figure 1A:
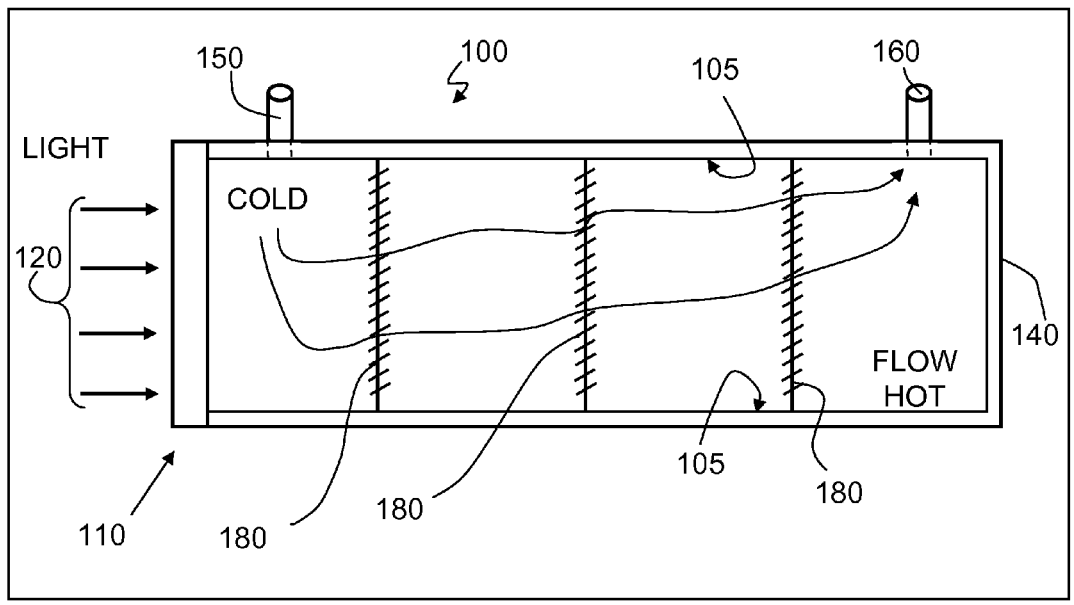
FIG. 1A depicts an exemplary side view of a tube receiver of an embodiment.

FIG. 1 depicts an embodiment of a direct-absorption receiver (DAR). In an embodiment of the direct-absorption receiver, a hollow vessel 100 may be a conduit or tube having, for example, a circular, hexagonal, or square cross-section. The hollow tube 100 may contain an inner surface area, e.g., walls 105, which is reflective of sunlight. The inner walls 105 may be made from a glass that is stable at high temperatures, e.g., fused quartz or fused silica, or reflective metal. FIG. 1 also depicts that a window 110, transparent to sunlight, may be positioned at one end of the tube so as to receive concentrated sunlight 120, e.g., from a heliostat field or parabolic dish. A heat transfer fluid (HTF), e.g., a molten salt or air, may be continuously injected near the window 110 at an inlet 150—at a single point or at several points along its perimeter or proximal to the window—so as to fill the interior of the tube from the front end to the back end, thereby creating a flow toward the back wall 140. In some embodiments, the back wall 140 may also be reflective of sunlight. Solar radiation is gradually absorbed along the receiver, due to the scattering/absorptivity property of the fluid and an array of absorber screens 180 disposed in the interior of the tube, configured to partially intercept incoming light, thus creating a temperature profile which increases with receiver depth. Heated HTF may leave the tube via an outlet 160. In one exemplary embodiment, the HTF is a molten salt, with the inlet temperature greater than 200° C., and the outlet's temperature greater than 500° C. Examples of molten salts include sodium nitrate, potassium nitrate, or a mixture of both, such as an eutectic mixture of both. Materials for the window 110 and the wall 105 may have an index of refraction compatible with the HTF's, so that both reflective losses and TIR are optimized. The window of some embodiments may be made of quartz or fused silica. Embodiments of the window may include an anti-reflective external coating. Embodiments of the window may include an internal coating to prevent abrasion, darkening, or chemical reactions with the HTF.

The heated HTF exiting the receiver may be used, for example, to produce steam in a steam generator, and the steam may expand through a steam turbine to produce electricity. The steam generator may include evaporation, superheat, and reheat stages. The cold HTF leaving the steam generator may be re-injected into the front-end of the DAR. The heated and unheated liquids may be stored in storage tanks such that the time of their use for steam generation may be independent of the time of collection of solar energy.

Figure 1B:
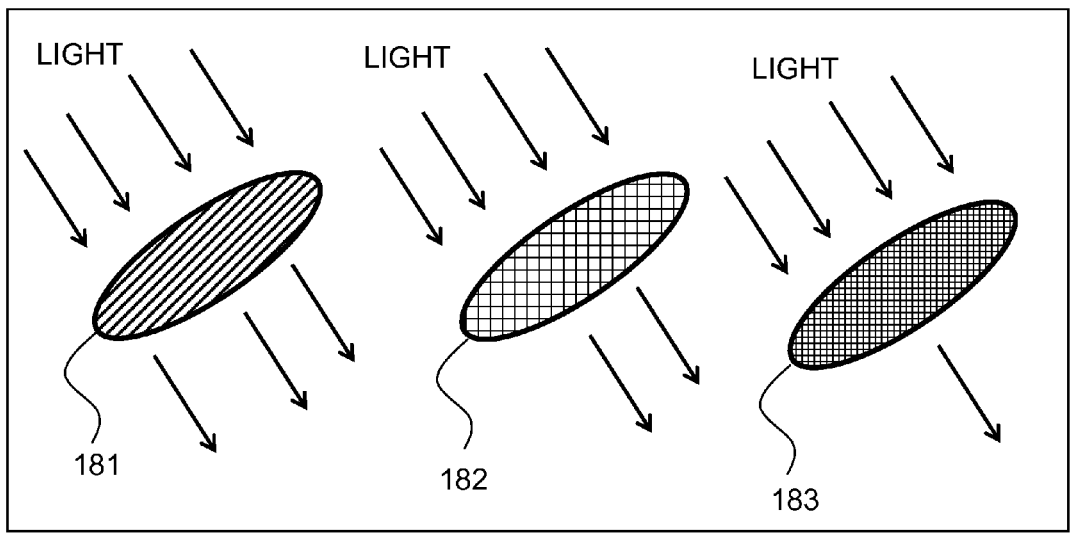
FIG. 1B depicts and array of exemplary absorbing elements, each having a different mesh density thereby absorbing light as a function of mesh density.

The rate of absorption of the incident solar radiation in the receiver, and the temperature profile of the salt, may be controlled by the introduction of opaque absorbing elements in the internal volume of the receiver. The absorbing elements may be wires, rods, wire meshes, perforated plates, or other radiation-absorbing elements that may be disposed within the vessel. The absorbing elements may have a mesh configuration whose density is designed for interception of a selected fraction of the incident radiation. For example, a black latticework may be struck by light, and as the density of the weave increases, more of the light is intercepted by the latticework, and less passes thru the latticework. FIG. 1B depicts an array of exemplary absorbing elements 181-183, each having a different density of mesh thereby absorbing more light with increasing density. Alternatively, or in addition, absorption may occur via pigmented particles suspended in the fluid. The opaque absorber elements absorb the intercepted fraction of the solar radiation and transfer the absorbed energy by convection to the flowing liquid. The absorbing elements may be made from stainless steel, a high-temperature alloy, or silicon carbide. The absorber elements may be coated, painted, or oxidized to increase their capacity to absorb solar radiation. When the absorber elements are arranged such that an effective area may be provided for convective heat transfer, the receiver may be subjected to high incident flux of about 1 MW/m² or higher.

Many liquids such as molten salts have high transparency at the visible band, and near infrared, and high opacity at the far infrared. Because of the transparency at shorter wavelengths, the incident radiation can penetrate deep into the DAR, and its rate of absorption and temperature profile may be controlled by the placement of absorber elements and their mesh densities. On the other hand, emission of radiation by the absorber elements is typically in the far infrared, and therefore may be absorbed by the liquid within a short distance. Little, if any, emission from the heated absorber elements from deep within the receiver cavity may exit back through the receiver front window, and accordingly the receiver emission loss due to re-radiation to ambient is minimized. In particular, highest temperatures may develop toward the deep interior of the DAR. In a sense this device acts as a continuous diode of thermal energy, allowing energy to be absorbed in only one direction, namely, that of the fluid flow.

In an exemplary embodiment, if nitrate salts are used, the highest temperature of the last absorber element may be above 500° C., and at this temperature about 96% of the emitted radiation is absorbed in the salt within about 2 cm. Therefore, emission loss from the receiver may be minimized, as it may be emission originating at or very near the window that may exit the receiver aperture. This radiation absorption may correspond to emission at the lowest temperature, i.e., that of the inlet cold HTF. Similarly, convection loss at the window is minimized as it occurs at a low temperature corresponding to the temperature of the inlet. In some embodiments, this low-to-high lengthwise temperature profile may be adjusted to minimize radiative losses.

In some embodiments, the temperature profile of the HTF may monotonically increase in the flow direction, a direction that may be vertical and/or inclined upward from the local level. Therefore, the flow has a stable thermal stratification, and there is no secondary recirculation due to natural convection, which could disturb the flow and reduce the performance of the receiver.

The index of refraction of molten salts, and in particular nitrate salts, may be close to that of a glass of the front window. Therefore, a reflection loss at the window may occur only on the front surface but not in the back surface. The reflection loss at the front surface of the window may be further reduced, for example, by application of an anti-reflective (AR) coating. Combining the low reflection loss with the low emission and convection losses, and if, for example, nitrate salts are used, with an unheated salt inlet temperature of approximately 280° C., the receiver efficiency may achieve about 93-96%.

Figure 2:
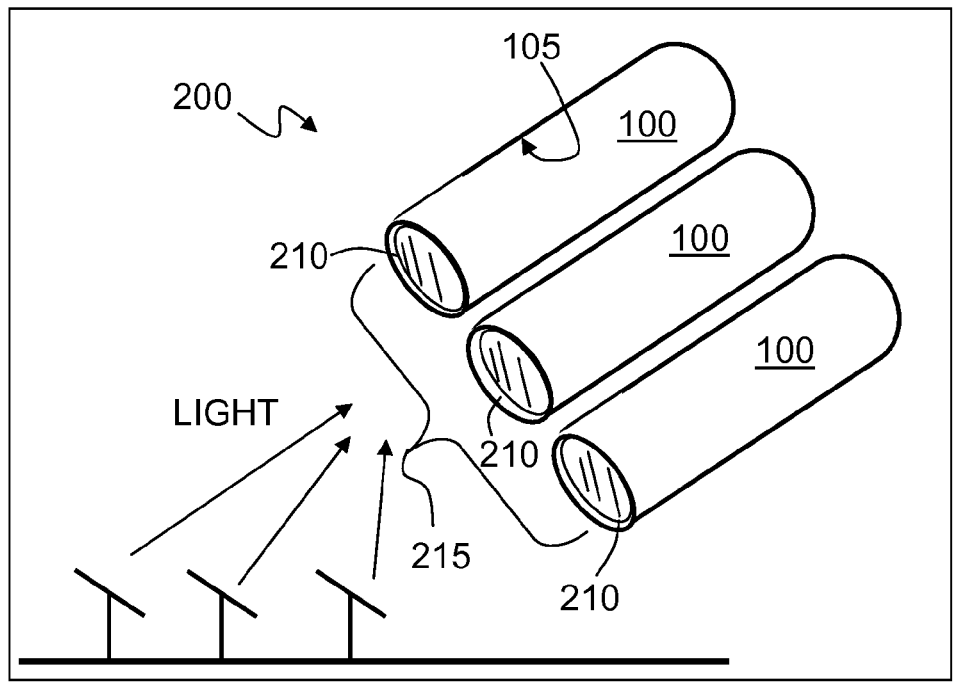
FIG. 2 depicts an exemplary bundling up of tube receivers for a bigger combined aperture of an embodiment.

FIG. 2 depicts an exemplary embodiment where a plurality of tubes 100 may be bundled together as a receiver 215. In some embodiments, the tubes may be hexagonal or square, and may pack closely with minimal space between the tubes and minimal space around the open regions. In one embodiment, inlet pipes and outlet pipes may fit within the interstitial spaces between the receiver tubes. The pressure inside the receiver may be near atmospheric. The internal pressure in excess of atmospheric pressure may be the hydrostatic pressure of the liquid. For example, for a 50/50 mixture of sodium/potassium nitrate salts, and receiver length of 1 m, the highest internal gauge pressure is about 0.22 bar which may be sustained by the window 210 and sidewalls 105. Optionally, the windows on each receiver may be flat or domed inwardly so as to reduce the required thickness. The profile of each tube may be conical—flaring or narrowing in the flow direction.

Figure 3:
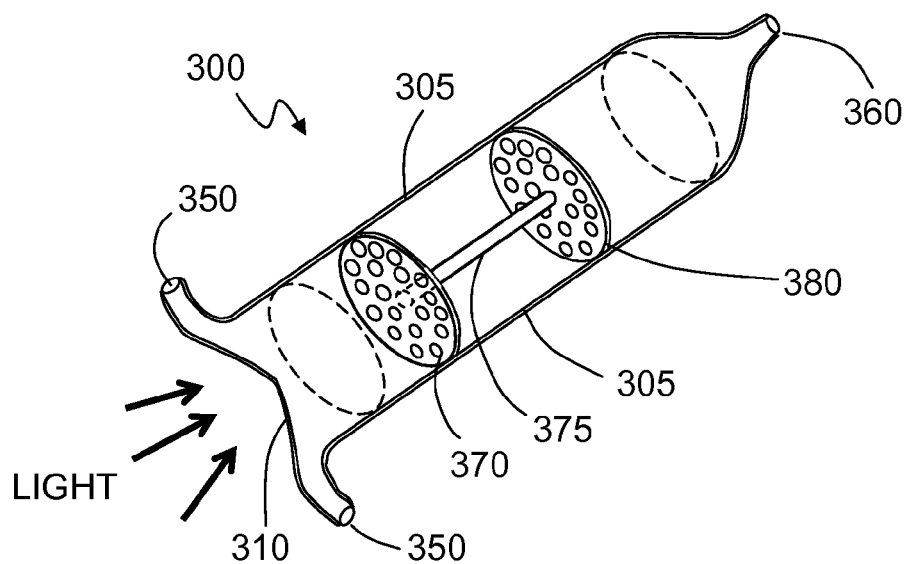
FIG. 3 depicts an exemplary single-vessel embodiment.

FIG. 3 is an embodiment of a single vessel version where the receiver comprises a single transparent vessel 300 with inlets 350 near the front window 310 which, for example, may be a concave hemispherical cap. The embodiment may contain an outlet 360 connector at the back end which may be integrated with the entire vessel 300. Alternatively, the back wall may be a lid attached to the entire vessel which only maintains a partial seal, and heated fluid could be collected as overflow. FIG. 3 further depicts an embodiment of two absorber plates 370,380—that may be perforated plates or wire meshes—which may regulate the temperature profile, and may also provide additional structural strength to the tube via a center connector 375, and contact by at least one of the absorber plates with an interior wall 305.

Figure 4A:
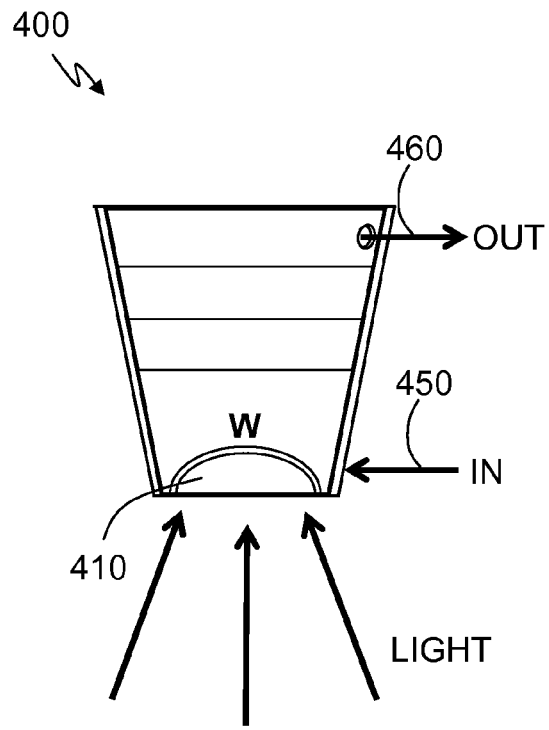
FIG. 4A depicts an exemplary tank embodiment with an inverted-dome window at the bottom of the tank.
Figure 4B:
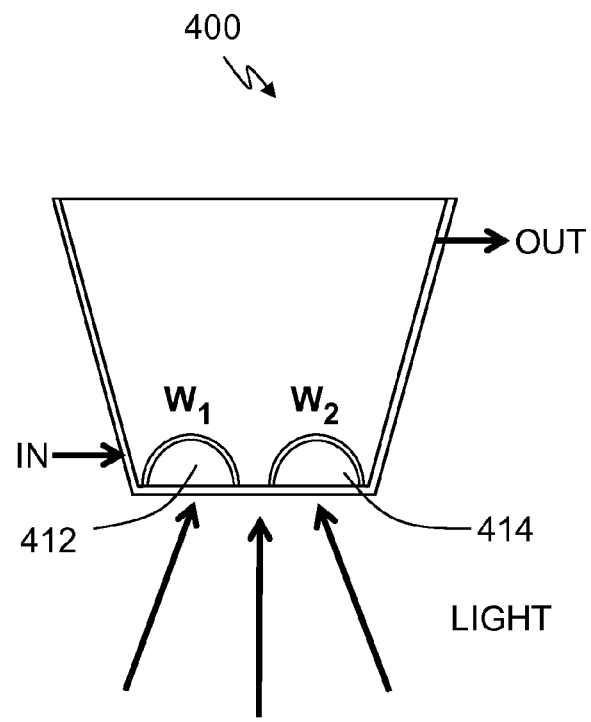
FIG. 4B depicts an exemplary tank embodiment with multiple windows at the bottom of the tank.

FIG. 4A depicts a tank embodiment of the receiver where a vertical reservoir 400 is shown with a window 410 (W) at the bottom of the reservoir 400 having an exemplary frusto-conical shaped wall about the window 410. In some embodiments, the window 410 may be a flat cap or optionally, concaved spherical cap or dome. Unheated HTF may be injected at the bottom inlet 450, and heated liquid may be collected from the top outlet 460. FIG. 4B depicts the same tank embodiment as in FIG. 4A where the reservoir 400 optionally contains a plurality of windows 412,414 ($W_1$, $W_2$) along the bottom sidewalls.

Figure 5:
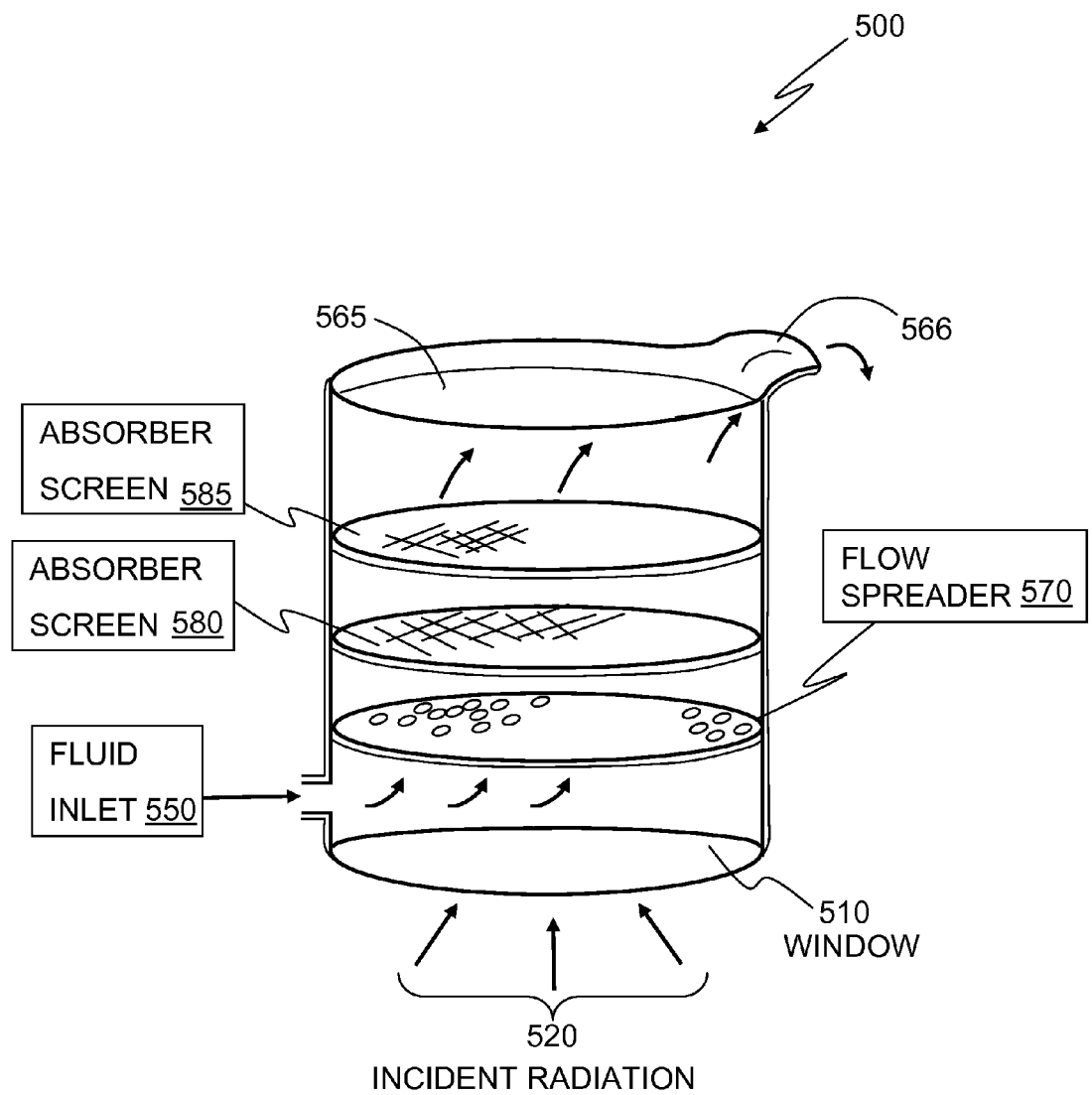
FIG. 5 shows further details of a particular tank receiver embodiment.

FIG. 5 depicts a tank receiver embodiment 500 where concentrated sunlight 520 enters the receiver through a bottom window 510 that may optionally be fused or sealed with the body of the receiver. HTF may be injected at one or more inlets 550 near the window 510. To facilitate even distribution of flow from bottom to top under an expected flux distribution—and also to avoid stagnation regions—a plurality of horizontal flow spreaders 570 and absorber screens 580,585 may be disposed within the receiver. Each flow spreader 570 may be a transparent plate with several perforations and, optionally even or uneven aperture shapes and sizes, e.g., perforated quartz. The index of refraction of a spreader 570 may be similar to the index of refraction of the HTF, i.e., the spreader may be transmissive to the incoming rays. Accordingly, a transmissive spreader may affect the flow independently from absorption where the degree of independence may depend on the position and density of each absorber screen. Heated HTF may be obtained from the outlet 566 at the top of the receiver and optionally in some embodiments, the heated HTF exits via a spout as overflow. Optionally, the receiver may be covered with an opaque or reflective lid 565, and no seal may be required due to the force of gravity.

FIGS. 6A and 6B depict the receiver as containing a transparent cylindrical window 610 and several concentric interior layers of flow spreaders 670, e.g., transparent perforated cylinders, and absorber screens 680. Light 620 may be incident around the outer cylinder, e.g., stemming from a heliostat field which partially or completely surrounds the tower on which the receiver is perched. Unheated HTF may be injected from an inlet 650 into the space between the outer transparent shell and the first internal wall—flow spreader or absorber—such that global flow may be radial and toward the center, as routed by the concentric flow spreaders. Optionally, light enters simultaneously radially and its heat is transferred to the fluid by the successive absorber screens, whose density, radii, and number is designed to maximize efficiency of the receiver, e.g., by controlling a radial temperature profile that increases toward the core. Heated HTF leaves the receiver through an outlet 660 at the innermost region, i.e., the receiver may have a heated core relative to the outer cylinder, thus reducing radiative losses. The flow spreaders may optionally have holes or apertures of varying sizes. In one embodiment, holes may be circular and increase in diameter or density with distance from the bottom of the receiver, e.g., to equalize flow through every hole for a present hydrodynamic pressure.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A solar thermal receiver comprising:
    a first containing member transparent to sunlight;
    a second containing member comprising an inner surface reflective of sunlight;
    an inlet proximate to the first containing member configured to receive injected heat transfer fluid;
    an outlet distal from the first containing member; and
    at least one flow spreader;
        wherein the first containing member and the second containing member together form a vessel configured to conduct injected heat transfer fluid from the inlet to the outlet under hydrostatic pressure, and the at least one flow spreader is disposed within the vessel concentrically about the outlet.

2. The solar thermal receiver of claim 1 further comprising at least one absorber member interposed in the vessel between the inlet and the outlet.

3. The solar thermal receiver of claim 2 wherein the at least one absorber member comprises one or more apertures configured to pass heat transfer fluid.

4. The solar thermal receiver of claim 1 further comprising at least one absorber member disposed in the vessel.

5. The solar thermal receiver of claim 4 wherein the at least one absorber member comprises one or more apertures configured to pass heat transfer fluid.

6. The solar thermal receiver of claim 1 wherein the heat transfer fluid is a molten salt.

7. The solar thermal receiver of claim 1 wherein the heat transfer fluid is air.

8. The solar thermal receiver of claim 1 wherein the first containing member transparent to sunlight is a window having an external anti-reflective coating.

9. The solar thermal receiver of claim 1 wherein the inlet proximate to the first containing member is further configured to receive injected heat transfer fluid in a range of 250° C.-350° C., and wherein the outlet distal from the first containing member is further configured to output heat transfer fluid in a range of 500° C.-600° C.

10. The solar thermal receiver of claim 1 wherein the first containing member transparent to sunlight is a window comprising at least one of: quartz and fused silica.

11. The solar thermal receiver of claim 1 wherein the second containing member comprises at least one of: stainless steel, a high-temperature alloy, and silicon carbide.

12. The solar thermal receiver of claim 2 wherein the at least one absorber member comprises as least one of stainless steel, a high-temperature alloy, and silicon carbide.

13. The solar thermal receiver of claim 1 further comprising heat transfer fluid having a temperature profile from the first containing member transparent to sunlight to the outlet increasing monotonically.

14. The solar thermal receiver of claim 1 further comprising heat transfer fluid having a flow direction upward from a local level.

15. The solar thermal receiver of claim 1 wherein the second containing member comprises at least one of: a circular cross-section, a polygon cross-section, and a frusto-conical shape.

16. The solar thermal receiver of claim 1 further comprising at least one absorber member disposed along a direction of heat transfer fluid flow wherein the direction of heat transfer fluid flow is defined by the disposition of the inlet and the outlet along the vessel.

17. The solar thermal receiver of claim 1 further comprising at least one flow spreader disposed along a direction of heat transfer fluid flow wherein the direction of heat transfer fluid flow is defined by the disposition of the inlet and the outlet along the vessel.

18. The solar thermal receiver of claim 1 further comprising at least one absorber member disposed within the vessel concentrically about the outlet.

19. The solar thermal receiver of claim 1 wherein the first containing member receives concentrated light at an average flux of at least 1 MW/m^2.

20. The solar thermal receiver of claim 1 wherein the first containing member transparent to sunlight is a window comprising a surface, internal to the vessel configured to conduct injected heat transfer fluid, wherein the internal surface comprises at least one of: an anti-abrading coating and an anti-darkening coating.

21. A solar thermal receiver comprising a bundled array of a plurality of solar thermal receiver vessels, wherein each vessel comprises:
    a first containing member transparent to sunlight;
    a second containing member;
    an inlet proximate to the first containing member configured to receive injected heat transfer fluid;
    an outlet distal from the first containing member; and
    one or more interstitial spaces each interposed between the plurality of vessels, wherein at least one interstitial space further comprises one or more fluid conduits positioned parallel to the plurality of solar thermal receiver vessels along the direction of heat transfer fluid flow;
    wherein the first containing member and the second containing member together form the vessel, the vessel configured to conduct injected heat transfer fluid from the inlet to the outlet under hydrostatic pressure.

22. A solar thermal receiver comprising a bundled array of a plurality of solar thermal receiver vessels, wherein each vessel comprises:
    a first containing member transparent to sunlight;
    a second containing member;
    an inlet proximate to the first containing member configured to receive injected heat transfer fluid;
    an outlet distal from the first containing member; and
    at least one flow spreader disposed within the vessel concentrically about the outlet;
    wherein the first containing member and the second containing member together form the vessel, the vessel configured to conduct injected heat transfer fluid from the inlet to the outlet under hydrostatic pressure.

* * * * *